Oct. 17, 1967 R. A. POWLUS 3,348,064

FLEXIBLE LOGIC CIRCUIT UTILIZING FIELD EFFECT TRANSISTORS AND LIGHT RESPONSIVE DEVICES

Filed Nov. 14, 1963 2 Sheets-Sheet 1

INVENTOR.
ROBERT A. POWLUS
BY John V. Regan
Attorney

Oct. 17, 1967 R. A. POWLUS 3,348,064

FLEXIBLE LOGIC CIRCUIT UTILIZING FIELD EFFECT TRANSISTORS AND LIGHT RESPONSIVE DEVICES

Filed Nov. 14, 1963 2 Sheets-Sheet 2

INVENTOR.
ROBERT A. POWLUS
BY John V. Regan
Attorney

United States Patent Office 3,348,064

Patented Oct. 17, 1967

3,348,064

FLEXIBLE LOGIC CIRCUIT UTILIZING FIELD EFFECT TRANSISTORS AND LIGHT RESPONSIVE DEVICES

Robert A. Powlus, Yardley, Pa., assignor to Radio Corporation of America, a corporation of Delaware Filed Nov. 14, 1963, Ser. No. 323,821
8 Claims. (Cl. 307—88.5)

This invention relates to electrical circuits and, in particular, to flexible logic circuits.

A logic circuit may be defined as a circuit capable of performing a logical operation, such as one of the operations AND, OR, NAND, NOR and the like. Modern digital computers, for example, employ a large number of different logic circuits for performing the various logical operations required to process information. Each logic circuit usually is capable of performing only a single logic operation. The total number of logic circuits required in a system, and the number of different types, often may be reduced by providing "flexible" circuits which are able to perform a number of different logical operations in accordance with applied control signals. Flexible logic circuits are particularly useful when the circuits are fabricated in so-called "integrated" form by deposition and other known techniques, since the number of different type circuits which need be manufactured may be reduced in number. Moreover, the manufacture can be simpler and space requirements further reduced when the signals used to control the logic function performed by a circuit are other than electrical in form. This is due to the fact that the number of connecting leads which need be fabricated is reduced.

Accordingly, it is one object of this invention to provide an improved flexible logic circuit which can perform more than one logical operation.

It is another object of this invention to provide an improved flexible logic circuit in which control signals used to determine the logical operation of the circuit are other than electrical in form.

It is still another object of this invention to provide an improved flexible logic circuit which may take advantage of the bidirectional properties and other desirable characteristics of insulated gate-field effect transistors.

A flexible logic circuit according to the invention includes a number of controlled devices having their current carrying paths connected in a series chain. The various devices are rendered conductive or nonconductive in response to information signals applied selectively to the devices. Each of a number of signal controlled switch means is connected between a different pair of points on the chain and across at least one current carrying path. The logical operation performed by the circuit is controlled in accordance with the control signals applied to the various switch means.

In the accompanying drawing, like reference characters denote like components, and:

Figure 1:
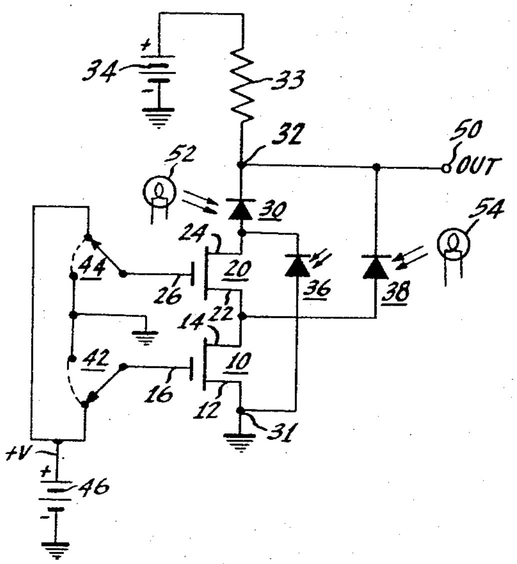
FIGURE 1 is a schematic diagram of a flexible logic circuit embodying the invention and having two information inputs.

As will be apparent as the description proceeds, certain ones of the amplifying devices employed in the logic circuit are bidirectional devices in the sense that current can flow in either direction through the device. Some bipolar transistors have this characteristic. Other, more recently developed devices, insulated gate-field effect transistors in particular, also have this characteristic and other characteristics which are especially desirable when the circuit is to be manufactured in integrated form.

An insulated gate-field effect transistor may be defined generally as a majority carrier field effect device which includes a semiconductor layer or wafer to which source and drain electrodes are affixed. A gate electrode is separated by an insulated film from a portion of the semiconductor which lies between the source and drain electrodes. Since the gate is insulated from the semiconductor it does not draw any current, or at least draws no appreciable current, whereby the drain electrode of one device may be connected directly to the gate electrode of another device to control the voltage at the gate of the other device and thereby control the conductivity of the device. This feature is advantageous when the circuits are constructed in integrated form because one circuit can drive a large number of other circuits with low power. Another advantage of the insulated gate-field effect transistor is that a large number of devices can be fabricated in a very small area.

Two types of insulated gate-field effect transistors useful in practicing the invention are the thin-film transistor (TFT) and the metal-oxide-semiconductor (MOS). The physical and operating characteristics of a TFT are described in an article by Paul K. Weimer, entitled, "The TFT—A New Thin-Film Transistor," appearing at pages 1462–1469 of the June, 1962 issue of the Proceedings of the IRE. The MOS transistor and its characteristics are described in an article entitled, "The Silicon Insulated-Gate Field-Effect Transistor," by S. R. Hofstein and F. P. Heiman, appearing at pages 1190–1202 of the September 1963 issue of the Proceedings of the IEEE. Reference may be had to the aforementioned articles for details of the devices.

Suffice it to say here that an insulated gate-field effect transistor may be of either the enhancement type or the depletion type, depending upon the preparation of the semiconductor, its conductivity, and the shape of the energy band at the interface between the semiconductor and the insulated gate. The enhancement type unit is of particular interest in the present application. When a device is operated in the enhancement mode, only a small leakage current flows between the source and drain electrodes when the voltages at the gate and source electrodes have the same value. Current flows between source and drain when the voltage at the gate electrode is increased in a first polarity direction (positive for an N type unit) relative to the voltage at the source electrode. The device is bidirectional in the sense that current can flow in either direction and, for this reason, the source and drain electrodes are interchangeable.

Although the use of insulated gate-field effect transistors is preferred, because of their especially desirable characteristics in these circuits, other types of devices which have suitable operating characteristics also may be used, bearing in mind that the amplifying devices in some portions of the circuits should be bidirectional.

A flexible logic circuit having two information inputs is illustrated schematically in FIGURE 1. The circuit comprises first and second insulated gate-field effect transistors 10 and 20 having their current carrying paths connected in series with a photodiode 30 between first and second junction points 31 and 32. First junction point 31 is connected to a point of reference potential, indicated by the conventional symbol for circuit ground. The other junction point 32 is connected by way of a resistor 33 to a source of bias potential, illustrated as a battery 34 having its negative terminal grounded.

First transistor 10 has a pair of electrodes 12, 14, and a gate electrode 16 to which a voltage may be applied for varying the conductivity of the conducting channel, or current carrying path, between the electrodes 12 and 14. Second transistor has a pair of electrodes 22, 24 which define a current carrying path. The conductivity of this path is controlled in accordance with the voltage applied between the gate electrode 26 and ground. The electrodes 22 and 24 are source and drain electrodes, but no attempt is made to designate either one particularly as the source or drain electrode in view of the fact that, as will be seen, current flows out of one electrode in one operating state of the circuit and flows out of the other electrode in another operating state of the circuit.

A second photodiode 36 is connected between circuit ground and the electrode 24 of the second transistor. A third photodiode 38 is connected between the electrode 22 and the junction point 32. A photodiode may be defined as a device that has a low forward impedance to current flowing in the forward direction through the device. The back impedance is high, relatively speaking, to current flowing through the device in the opposite direction when the device is in the dark state, and is relatively low with respect to the opposite direction current when the device is subjected to applied light. These devices 30, 36 and 38 are connected so as to present, when in the dark state, a high back impedance to conventional current supplied by the battery 34. The photodiodes, which function as signal-controlled switch means to control the logical operation performed by the circuit, are one illustration of a preferred, suitable switch means. Other types of devices, such as photoconductors, field effect transistors, etc., also may be used. If the switch means are evaporated cadmium sulfide photoconductors and the transistors are TFT's, the entire circuit may be completely evaporated at one time. The photodiodes may also be termed signal controlled elements responsive to radiation signals, in this case, light signals.

The means for applying input signals at the gate electrodes 16 and 26 is illustrated symbolically in the drawing as a pair of switches 42, 44. One terminal of each of the switches is connected directly to ground and the other terminal of each of the switches is connected to the positive terminal of a battery 46. The negative terminal of battery 46 is grounded. In actual practice, the input signals to the gate electrodes 16 and 26 probably would be applied by means of other logic circuits or signal sources, rather than by manually operated switches 42, 44.

Consider now the operation of the circuit and assume that a light input is applied to the first photodiode 30 from a source 52 and that the other photodiodes 36, 38 are in the dark state. The impedance of photodiode 30 is very low at this time and may be neglected for convenience. First and second transistors 20 are in a high impedance state when the respective switches 42 and 44 are grounded. Only a very small leakage current then flows through the current carrying paths defined by the electrodes 12, 14, 22 and 24. There is essentially no voltage drop across the load impedance 33, and the battery 34 voltage appears at the output terminal 50. The same output condition exists if either one of the switches 42 or 44, but not both, is thrown into contact with the positive terminal of the battery 46. However, when both switches 42 and 44 are connected to +V volts, first and second transistors 10 and 20 conduct and the impedances of the current carrying paths of these transistors switch to a very low value. Substantial current then flows in a downward direction through the series path comprising the load resistor 33, photodiode 30 and transistors 20 and 10. The impedance of the path between junction point 32 and ground is very low relative to the impedance of the load resistor 33 whereby the output voltage at terminal 50 falls close to zero volts. It will be recognized that the logical function described above is the NAND function for positive signals, that is to say, the circuit operates as an AND gate with inversion.

The logical operation performed by the circuit may be altered by changing the pattern of the light inputs to the photodiodes 30, 36 and 38. Consider, for example, that photodiodes 36 and 38 now are subjected to applied light control signals from a source 54 and that the photodiode 30 is in the dark state. The impedance of photodiode 30 then is very high, while the impedances of the other two photodiodes 36, 38 are very low. With both of the switches 42 and 44 connected to ground, the impedances of the current carrying paths of transistors 10 and 20 are very high and only leakage current flows through the transistors. Accordingly, the voltage of the battery 34 appears at output terminal 50.

Assume now that switch 42 is thrown into electrical contact with the positive terminal of battery 46 and that switch 44 is grounded. The impedance between the electrodes 12 and 14 of first transistor 10 then is very low. Current flows from battery 34 through load resistor 33, photodiode 38 and first transistor 10 to ground. The impedance of the path between junction point 32 and ground is very low relative to the impedance of the load resistor 33, and the output voltage at terminal 50 is close to ground potential.

Consider now the operation of the circuit when switch 44 is connected to the battery 46 and switch 42 is grounded. First transistor 10 is essentially cutoff and second transistor 20 is in a state of high conduction with a low impedance between its electrodes 22 and 24. A low impedance now is present between the junction point 32 and ground, and current from battery 34 flows in a downward direction through resistor 33, photodiode 38, upward through second transistor 20 and downward through photodiode 36 to ground. The output voltage at terminal 50 then is close to ground potential. It will be noted that the direction of current flow through the second transistor 20 for this condition is opposite to the direction of current flow through the transistor 20 when the circuit is operated as a NAND gate. For this reason, second transistor 20 must be a bidirectional device.

It will be recognized that the circuit performs the NOR logical operation (OR function with inversion) when photodiodes 36 and 38 are in the low impedance condition and photodiode 30 is in the high impedance condition. That is to say, the voltage at output terminal 50 falls from a relatively high positive voltage to a less positive voltage when the voltage at either gate 16 or 26 rises from ground potential to +V volts. In actual practice, battery 34 may have a value of +V volts, in which case the output voltage at terminal 50, which is applied to a succeeding gate (not shown), has a value of either +V volts or zero volts, the same as the voltages applied at gate electrodes 16 and 26.

Figure 2:
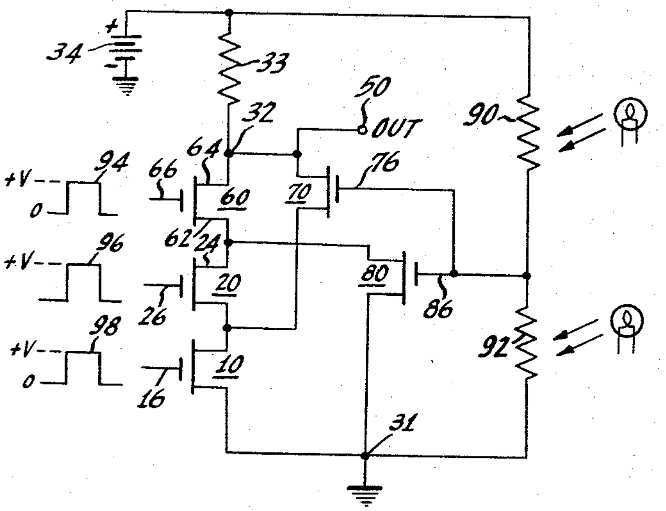
FIGURE 2 is a schematic diagram of a flexible logic circuit embodying the invention in which signal-controlled amplifying devices are employed as the logic determining switch means.

In the circuit of FIGURE 2, a third insulated gate-field effect transistor 60 has its current carrying path connected in series with the current carrying paths of the first and second transistors 10 and 20. The electrode 64 of third transistor 60 is connected directly to the junction point 32, and the electrode 62 is connected directly to the electrode 24 of second transistor 20. The signal-controlled switch means in FIGURE 2 are illustrated as a pair of insulated gate-field effect transistors 70 and 80 which have their gate electrodes 76 and 86 connected together and to the junction of a pair of photoconductors 90 and 92. Photoconductors 90 and 92 are connected in series, in the order named between the positive terminal of battery 34 and circuit ground. The transistor 70 has its current carrying path connected across the current carrying paths of the second and third transistors 20, 60, respectively, and transistor 80 has its current carrying path connected across the series connected current carrying paths of the first and second transistors 10, 20 respectively.

As is known, a photoconductor is a variable impedance device which is bidirectional in nature and which has a very high impedance, relatively speaking, in the dark state and a very low impedance, relatively speaking, when it is exposed to light of sufficient intensity. The two photoconductors 90 and 92 operate to control the voltage applied at the gate electrodes 76 and 86. When photoconductor 90 alone is subjected to applied light, the voltage applied at the gate electrodes 76 and 86 has a value substantially equal to the voltage of battery 34, and both of the transistors 70 and 80 then are in a low impedance condition. Under these conditions, the FIGURE 2 circuit operates to perform the logical NOR function as follows. Assume that the voltage at gate electrode 16 of first transistor 10 is +V volts and that the other gate electrodes 26 and 66 are at zero volts. First transistor 10 then is highly conductive and a low impedance path, comprising first transistor 10 and first control transistor 70 appears between the junction point 32 and ground. Accordingly, the voltage at the output terminal 50 is approximately zero volts.

If the voltage at gate electrode 26 is at +V volts and the gate electrodes 16 and 66 are at ground potential, second transistor 20 is in a state of high conduction and first and third transistors 10 and 60 are essentially cutoff. Current from battery 34 flows downward through load resistor 33 and the current carrying path of first control transistor 70, upward through second transistor 20, and downward through the current carrying path of second control transistor 80 to ground. The low impedance of the path between junction point 32 and ground results in an output voltage close to ground potential at output terminal 50.

If the voltage at gate electrode 66 is +V volts and the gate electrodes 16 and 26 are grounded, only the third input transistor 60 is in a low impedance condition. Current flows from battery 34 through load resistor 33 and the low impedance condition path comprising third input transistor 60 and second control transistor 80 to ground, and the output voltage at terminal 50 is close to ground potential. Substantially no current flows through first control transistor 70 at this time because of the high impedance of the current paths in first and second transistors 10 and 20.

Consider now the condition which exists when photoconductor 92 is illuminated and the other photoconductor 90 is in the dark state. The gate electrodes 76 and 86 then are close to ground potential because of the relatively low impedance of the photoconductor 92, and the control transistors 70 and 80 are both in a very high impedance state. Under these conditions, the impedance of the transistor circuitry between junction point 32 and ground is very, very high relative to the impedance of the load resistor 33, except when all of the input transistors 10, 20 and 60 are in the low impedance condition. Stated in another way, the impedance between junction point 32 and ground is very, very high, and the voltage at output terminal 50 is close to the battery 34 voltage, except when all of the gate electrodes 16, 26 and 66 of the input transistors 10, 20 and 60 are at +V volts.

It is thus seen that the circuit performs the logical NAND operation when photoconductor 92 is in the low impedance condition and photoconductor 90 is in the high impedance condition. Current flows in a downward direction through the current carrying path of second transistor 20 when the circuit performs the NAND function, and flows in an upward condition when the circuit performs the NOR function. Thus, second transistor 20 must be bidirectional.

Figure 3:
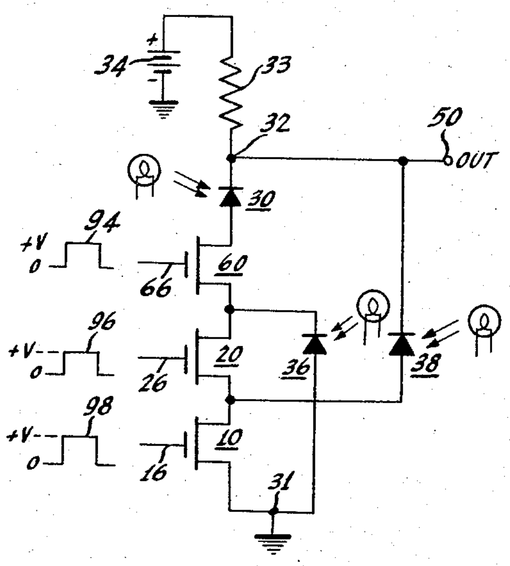
FIGURES 3 and 4 are schematic diagrams of other logic circuits similar to the logic circuit of FIGURE 1, but having different numbers of information inputs.

The FIGURE 3 circuit is a three input circuit illustrated as employing photodiodes 30, 36 and 38 as the switch means which determine the logical operation of the circuit. The FIGURE 3 circuit is otherwise substantially identical to the FIGURE 2 circuit, except that photodiode 30 is connected between the current carrying path of third transistor 60 and the junction point 32. Consider that photodiodes 36 and 38 are in the dark state and that light is applied to the photodiode 30. Photodiodes 36 and 38 then are in a very high impedance state and conduct little current, if any, whereby their presence may be neglected. The only path for current flow from battery 34 to ground is through the serially connected current carrying paths of the transistors 10, 20 and 60. This path has a very high impedance relative to the impedance of the load resistor 33 when any of the transistors is in the nonconducting condition. Accordingly, the output voltage at terminal 50 is close in value to the battery 34 voltage, except when input signals 94, 96 and 98 are applied at the gate electrodes 66, 26 and 16 respectively. Thus, the FIGURE 3 circuit performs the logical NAND operation under these conditions.

The FIGURE 3 circuit performs the NOR logical operation when light is directed to all of the photodiodes 30, 36, 38. Operation of the circuit then is the same as that of the FIGURE 2 circuit with photoconductor 90 exposed to light. For this reason, the operation will not be described further.

Figure 4:
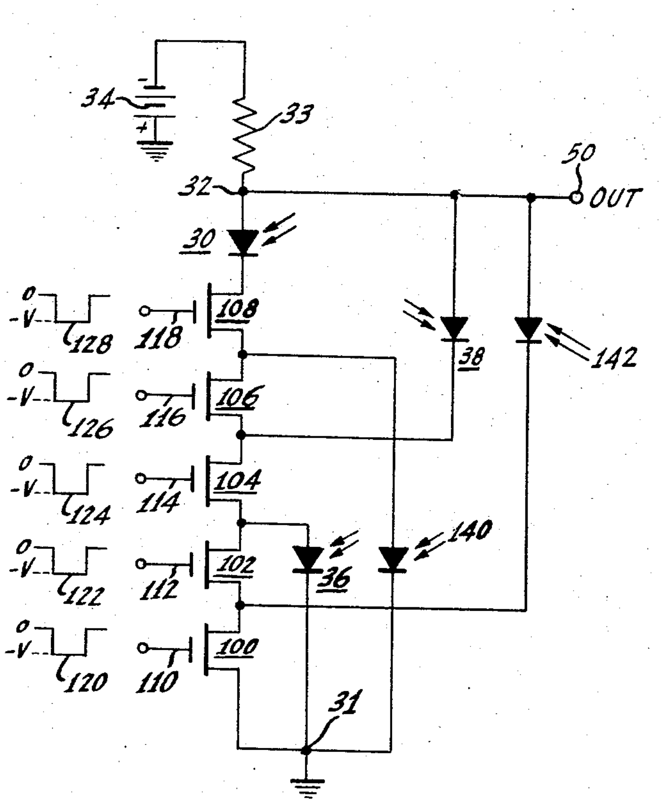

The circuits of FIGURES 1, 2 and 3 thus far described are illustrated as employing N type field effect transistors. It will be apparent to one skilled in the art, however, that P type transistors could be used instead, provided that the polarities of the various bias sources and input signals are reversed, and provided further that the connections to the photodiodes in FIGURES 1 and 3 also are reversed. To illustrate this point, there is shown in FIGURE 4 a schematic diagram of a five input flexible logic gate which employs five P type insulated gate-field effect transistors 100–108 having gate electrodes 110–118, respectively.

The conducting channels of the five transistors 100–108 are connected in series with a photoconductor 30 between the junction points 31 and 32, and energized by a battery 34 which has its negative terminal connected at the upper end of load resistor 33 and its positive terminal grounded. Photodiode 30 is connected so as to conduct current in the reverse direction, and then only when the photodiode 30 is exposed to light. The information input signals 120–128 are applied selectively and individually at the gate electrodes 110–118, respectively, varying between zero volts and —V volts in contradistinction to the input signals employed in the previously discussed circuits which vary between zero volts and +V volts.

A first switch means 36, which may be a photodiode, is connected between the junction point 31 and a point on the series chain of transistors between the second and third transistors 102 and 104. Photodiode 36, as seen in the drawing, is connected across the series connected current carrying paths of the first and second transistors 100 and 102. A second switch means 140 is connected between the junction point 31 and a point on the series chain between the fourth and fifth transistors 106 and 108. Third and fourth switch means 38 and 142 are connected between the other junction point 32 and the junctions of the third and fourth transistors 104 and 106 and the first and second transistors 100 and 102, respectively. When the switch means 36, 38, 140 and 142 are photodiodes, they are connected so that current from the battery 34 flows through the photodiodes in their reverse conducting direction and, as previously described, only when the devices are exposed to incident light.

Consider first the operation of the circuit when only the photodiode 30 is exposed to light. Photodiode 30 then has a very low impedance, relatively speaking, and the other photodiodes are in the high impedance state and may be neglected for purposes of discussion. The only path for current flow from battery 30 to ground is through the series connected chain of input transistors 100–108. The impedance of the series path between junction points 31 and 32 is very high whenever any of the gate electrodes 110–118 is at ground potential, and the output voltage at terminal 50 then is close to the value of battery 34. When all of the gate electrodes 110–118 are at —V volts, all of the transistors 100–108 are in a low impedance state and current, in the conventional sense, flows upward through the series chain from ground to the negative terminal of battery 34. The output voltage for this condition is close to ground potential. It is thus seen that the circuit performs the logical NAND function for negative going signals when photodiode 30 is in the light state and the other photodiodes 36, 38, 140 and 142 are in the dark state.

Consider now the operation of the circuit when all of the photodiodes 30, 36, 38, 140 and 142 are exposed to light of sufficient intensity to lower the impedance of these devices to a very low value. Each of the several complete current paths between circuit ground and the negative terminal of battery 34 is through at least one photodiode and the current carrying path of at least one of the input transistors. Accordingly, the output voltage at terminal 50 is close to the battery 34 voltage when all of the gate electrodes 110–118 are at zero volts.

The output voltage at terminal 50 falls close to ground potential whenever the voltage at any one or more of the gate electrodes 110–118 falls to —V volts. The conduction paths for the respective transistors 100–108 are as follows. (1) Current flows from ground upward through first transistor 100 and photodiode 142 to the battery 34. (2) Current from ground flows upward through the photodiode 36, downward through second transistor 102 and upward through photodiode 142 to the negative terminal of the battery. (3) Current flows from ground through photodiode 36, upward through third transistor 104 and photodiode 38 to the battery 34. (4) Current flows upward through photodiode 140, downward through fourth transistor 106 and upward through photodiode 38 to the battery 34. (5) Current flows upward through photodiode 140, fifth transistor 108 and photodiode 30 to the battery 34. The impedance of each different one of these current paths has a low value only when the voltage at the gate electrode of the associated transistor is at —V volts. The circuit thus performs the NOR function when all of the photodiodes are exposed to light.

It is to be noted that the current flow through the second and fourth transistors 102 and 106 flows in one direction through the devices when the circuit performs the OR-NOT function and flows in the opposite direction through the devices when the circuit performs the AN-NOT function. For this reason, the second and fourth transistors 102 and 106 should be bidirectional devices. It is apparent from the above description that the circuit is capable of performing other, different logical operations in response to other, different combinations of control signals applied to the photodiodes.

What is claimed is:

1. The combination comprising:
- a pair of junction points;
- a plurality of devices, each device having first and second electrodes defining a current carrying path and having a control electrode for controlling the impedance of the path;
- means connecting the circuit paths of said devices in a series chain between said junction points;
- means for applying an energizing potential across said junction points;
- means for selectively varying the voltage at the control electrodes of said devices individually;
- a number of light responsive elements each connected between a different pair of points on said chain and across at least one of said current carrying paths; and
- means for applying light selectively to said elements to control the conductivity thereof.

2. The combination comprising:
- a plurality of devices, each device having first and second electrodes defining a current carrying path and having a control electrode for controlling the impedance of the path;
- means connecting the current paths of said devices in a series chain, at least the devices other than the two at the ends of said chain being bidirectional conducting devices;
- means for applying a voltage across the ends of said chain;
- means for applying input signals selectively and individually to the control electrodes of said devices;
- a number of radiation responsive elements each having at least a relatively high impedance condition and a relatively low impedance condition, each different element being connected between a different pair of points on said chain and across at least one of said current carrying paths; and
- means for selectively irradiating said elements to control the impedances thereof.

3. The combination comprising:
- a plurality of insulated gate-field effect transistors, each transistor having a source electrode and a drain electrode defining a current carrying path, and a gate electrode for controlling the impedance of the path;
- means connecting the current paths of said plurality of transistors in a series path;
- means for connecting a voltage source across the ends of said chain;
- means for varying the voltage at each said gate electrode selectively and individually to control the impedance of the associated said path;
- a number of radiation responsive, variable impedance control elements, each of said elements being connected between a different pair of points on said chain and across at least one of said current carrying paths; and
- means for selectively irradiating said control elements.

4. The combination as claimed in claim 3 wherein all of the transistors are of the same conductivity type.

5. The combination comprising:
- a pair of junction points;
- a plurality of insulated gate-field effect transistors, each having a source electrode and a drain electrode defining a current carrying path and having a gate electrode for controlling the impedance of the path;
- means connecting the current carrying paths of said transistors in series between said junction points;
- a load impedance and a source of energizing potential serially connected with each other across said junction points;
- means for selectively applying input signals between one of said junction points and the gate electrodes of said transistors;
- a number of radiation responsive, variable impedance elements, one of said elements being connected to one of said junction points and across a first combination of said current carrying paths, another of said elements being connected to the other of said junction points and across a different combination of said carrying paths; and
- means for selectively irradiating said elements for controlling the impedances thereof.

6. The combination comprising:
- a plurality of devices, each device having first and second electrodes defining a current carrying path and having a control electrode for controlling the impedance of the path;
- means connecting the current paths of said devices in a series chain;
- means for varying the voltages at the various control electrodes individually and selectively;
- a number of radiation responsive, variable impedance elements, each of said elements being connected between a different pair of electrically different points on said chain and across at least one of said current carrying paths; and means for selectively irradiating said elements.

7. The combination comprising:

a plurality of insulated gate-field effect transistors each having source and drain electrodes defining a current carrying path and a gate electrode for controlling the impedance of the path;

a pair of junction points;

means connecting said current carrying paths in circuit with each other between said junction points;

means for applying operating potential across said pair of junction points;

means for applying electrical input signals at the gate electrodes of said transistors individually and selectively in accordance with applied information signals;

a number of other field effect transistors each having a current carrying path and a gate electrode, each of the latter current carrying paths being connected across a different combination of current carrying paths of said plurality of transistors;

a plurality of radiation responsive, variable impedance elements, the gate electrode of each of said other field-effect transistors being connected to at least one of said radiation responsive elements; and means for selectively irradiating said elements.

8. The combination comprising:

a plurality of amplifying devices, each device having first and second electrodes defining a current carrying path and having a control electrode for controlling the impedance of the path;

a pair of junction points;

means connecting the current carrying paths of said devices in a series chain, one end of said chain being connected to one of said junction points;

a number of signal-controlled switch means, one of said switch means being connected between the other of said junction points and the other end of said chain, a second one of said switch means being connected across the series combination of said first switch means and at least one of said current carrying paths, a third one of said switch means having one terminal connected to said one of said junction points and the other terminal connected to a point on said series chain so that the third switch means is connected across at least one of the current carrying paths;

means for applying information signals selectively between the control electrodes of said devices and said one of said junction points;

means for applying control signals selectively to said switch means; and means for applying operating potential across said pair of junction points.

References Cited

UNITED STATES PATENTS

| | | | |
|---|---|---|---|
| 3,157,792 | 11/1964 | Low et al. | 307—88.5 |
| 3,201,574 | 8/1965 | Szekely | 307—88.5 |

ARTHUR GAUSS, *Primary Examiner.*

R. H. EPSTEIN, *Assistant Examiner.*